(12) United States Patent
Zinsmeyer

(10) Patent No.: US 8,434,594 B2
(45) Date of Patent: May 7, 2013

(54) ROTATING PLATFORM FOR OBSERVATION, PHOTOGRAPHY, AND/OR HUNTING

(75) Inventor: Charles D Zinsmeyer, Austin, TX (US)

(73) Assignee: Waterloo Outdoor Products, Austin, TX (US)

( * ) Notice: Subject to any disclaimer, the term of this patent is extended or adjusted under 35 U.S.C. 154(b) by 302 days.

(21) Appl. No.: 12/780,667

(22) Filed: May 14, 2010

(65) Prior Publication Data

US 2010/0288584 A1  Nov. 18, 2010

Related U.S. Application Data

(60) Provisional application No. 61/216,315, filed on May 18, 2009.

(51) Int. Cl.
   *E04G 1/00* (2006.01)
(52) U.S. Cl.
   USPC .......................................... 182/223; 182/148
(58) Field of Classification Search .................. 182/222, 182/223, 131, 69.6, 115, 148, 65.1
   See application file for complete search history.

(56) References Cited

U.S. PATENT DOCUMENTS

| | | | | |
|---|---|---|---|---|
| 134,677 A | * | 1/1873 | Kennedy | 212/253 |
| 1,141,919 A | * | 6/1915 | Auchu | 403/379.5 |
| 1,531,982 A | * | 3/1925 | Sago | 182/41 |
| 2,327,068 A | * | 8/1943 | Rylander | 198/377.02 |
| 2,647,022 A | * | 7/1953 | Smid et al. | 182/13 |
| 3,686,804 A | * | 8/1972 | Browne | 52/31 |
| 3,709,322 A | * | 1/1973 | Mitchell | 182/62.5 |
| 4,356,887 A | * | 11/1982 | Fisher et al. | 182/69.5 |
| 5,220,116 A | * | 6/1993 | Sheets | 42/94 |
| 5,491,921 A | | 2/1996 | Allen | |
| 5,697,180 A | * | 12/1997 | Morizio | 42/94 |
| 6,119,812 A | * | 9/2000 | Chin et al. | 182/223 |
| 7,152,358 B1 | | 12/2006 | LeAnna et al. | |
| 2008/0135080 A1 | * | 6/2008 | Greene et al. | 135/121 |

OTHER PUBLICATIONS

Definition of 'foot' provided in Action The American Heritage® Dictionary of the English Language, Fourth Edition copyright © 2000 by Houghton Mifflin Company. Updated in 2009. Published by Houghton Mifflin Company. All rights reserved.*

Definition of 'motor' provided in the Action The American Heritage Dictionary of the English Language, Fourth Edition copyright © 2000 by Houghton Mifflin Company. Updated in 2009. Published by Houghton Mifflin Company. All rights reserved.*

\* cited by examiner

*Primary Examiner* — Kathaerine W Mitchell
*Assistant Examiner* — Daniel Cahn
(74) *Attorney, Agent, or Firm* — Hulsey, P.C.; Loren T. Smith; William N. Hulsey, III

(57) ABSTRACT

A highly stable rotating platform with a base, a roller deck assembly on top of the base, and a shooting deck coupled to the roller deck via leg assemblies. The leg assemblies contain two vertical members with an angled cross member between the vertical members providing strength and stability. Bi-directional, unrestricted rotation of the roller deck assembly and shooting deck (in an unlimited number of degrees—e.g. multiple rotations) is accomplished by wheels in the roller deck which rotate around, and to the outside of, a safety guide attached to the base. The wheels may protrude through the top of the roller deck permitting the operator to precisely, easily, and smoothly rotate the roller deck and shooting deck by only moving his/her foot on the protruding wheel thereby not substantially changing their position relative to the shooting deck. The wheels may also be cambered and/or crowned to add lateral stiffness.

2 Claims, 12 Drawing Sheets

(Prior Art)

(Prior Art)

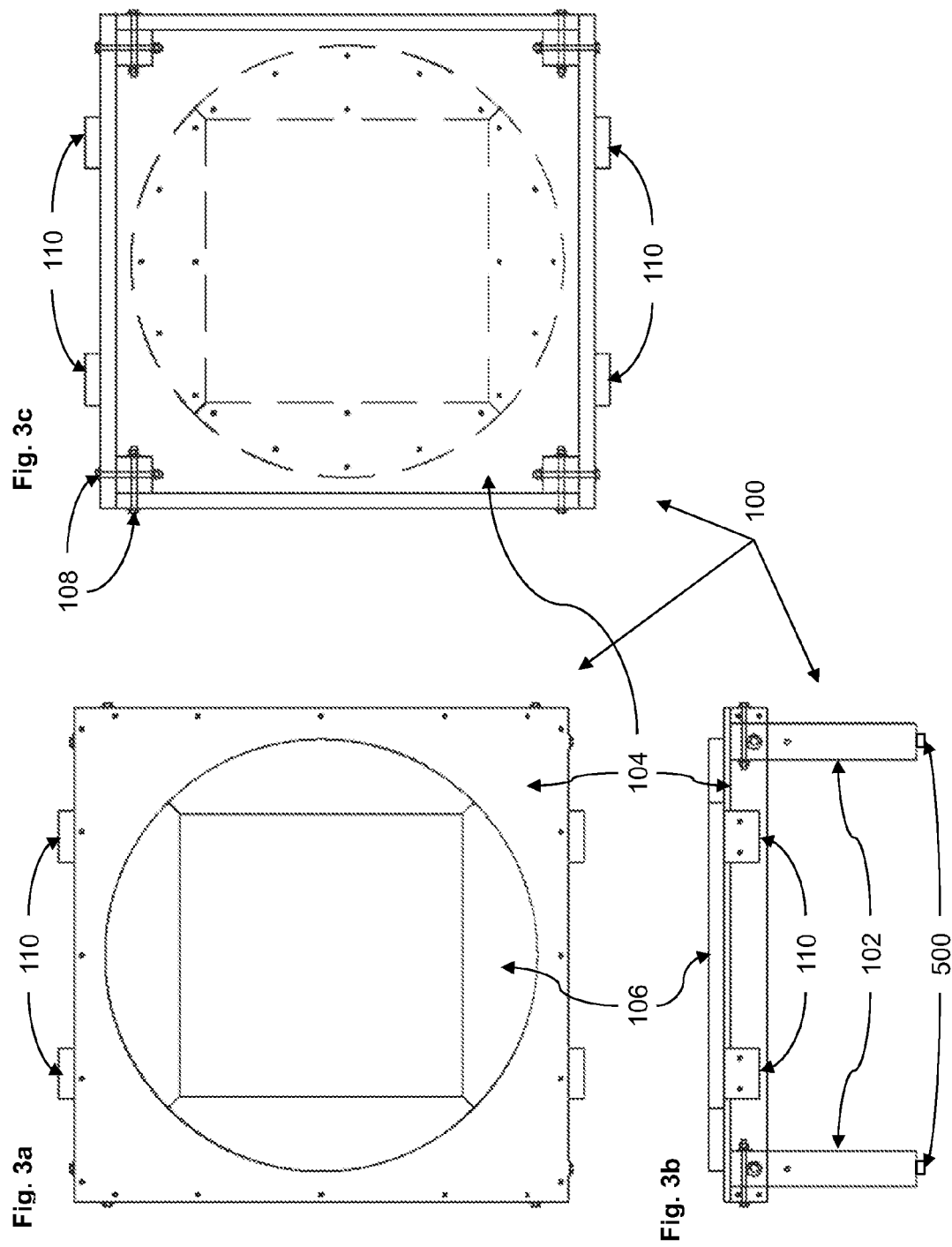

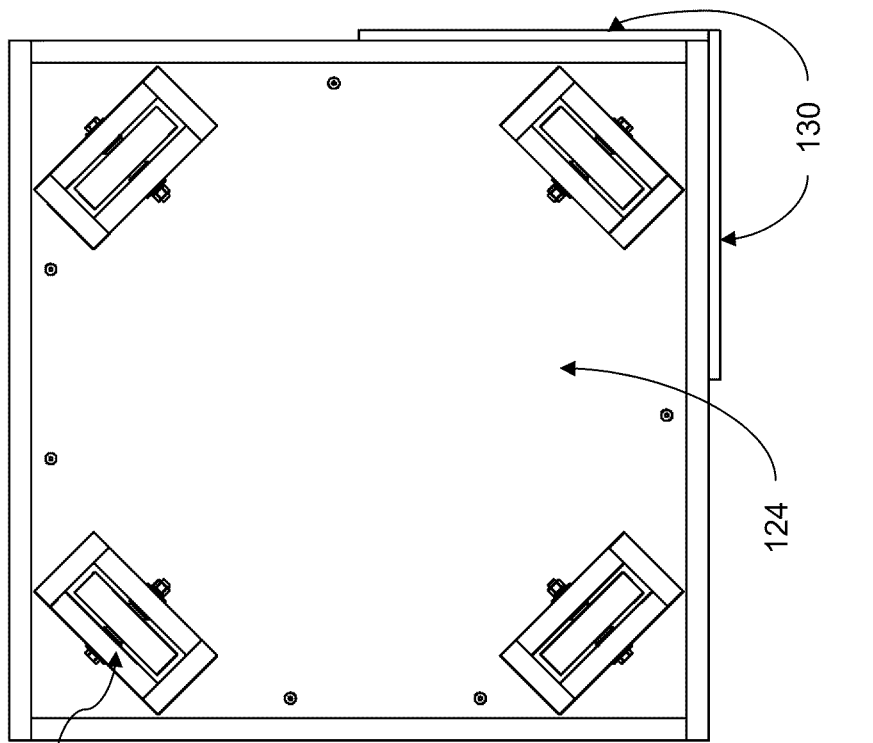
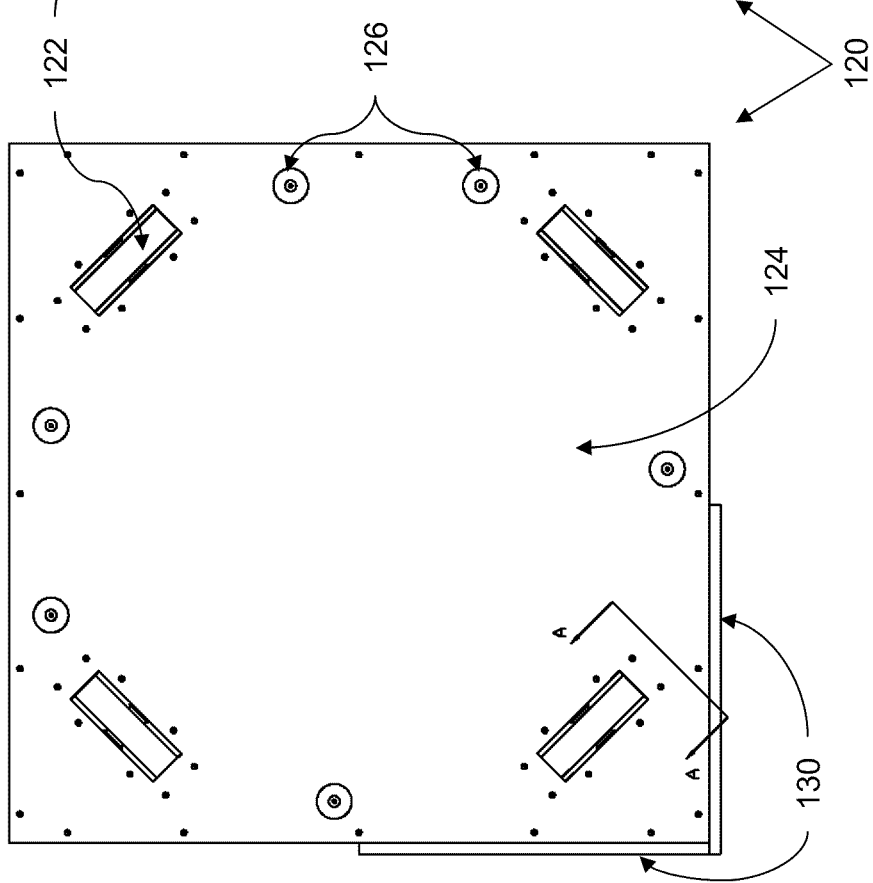

ROTATING PLATFORM FOR OBSERVATION, PHOTOGRAPHY, AND/OR HUNTING

CROSS REFERENCE TO RELATED APPLICATION

This application claims the priority of previously filed U.S. Provisional Application No. 61/216,315, filed on May 18, 2009, and entitled "ROTATING PLATFORM APPARATUS FOR GAME OBSERVATION, PHOTOGRAPHY, AND HUNTING" said Provisional Application being incorporated herein for all purposes as if fully set forth.

FIELD OF THE INVENTION

The invention relates to a rotating seating platform, and more specifically to a highly stable and rigid rotating seating platform for observation, photography, and/or hunting.

BACKGROUND OF THE INVENTION

Reasonably portable benches have existed for some time. These types of benches are primarily used in photography, observation, and/or hunting when the operator requires a steady surface. For example, in a hunting or photography application, when the target is a great distance away (potentially over several hundred yards), the operator requires an exceptionally steady and stable surface to perform the desired action. For example, if the operator is photographing wildlife at long distances and/or in low light situations, the operator must hold the camera very still in order to capture a crisp image. As another example, if the operator is hunting varmints, where shots routinely exceed several hundred yards, any movement could easily cause the operator to miss his/her target.

One such solution appears in FIG. 1a. This shooting bench permits a table 7, accessory tray 6, and forward gun rest 8 to pivot about a main telescoping supporting member 2. Additionally, the shooting bench provides a seat 9 mounted to the cross member 1 which is propped on legs 3 and 4. Although the seat may rotate about the main telescoping member 2, this requires substantial work on the part of the operator. The operator, at the least, must remove his/her weight from the legs 3 and 4, and either slowly "scoot" the seat 9 around, or stand completely up, step over the cross member 1 and rotate the seat 9 about the main telescoping member 2. Furthermore, because each of the parts pivotally rotate about the main telescoping member 2, the rotation of any part requires the loosening and tightening of clamps and/or bolts. This obviously takes a both a significant amount of time and effort. Furthermore, because each of the parts are rotationally non-rigid, they are not very stable especially relative to one another. Therefore movement/bending in one affects the others providing a significantly less rigid and stable bench.

Additionally, because the main telescoping member 2, is attached to a straight support bar 5 and the legs 3 and 4 (by virtue of cross member 1), there is no way for an operator to achieve a level shooting bench on sloping or otherwise unlevel or irregular ground. Additionally, because the seat 9 is attached to the main telescoping member 2 (by virtue of cross member 1), any movement from the operator is transferred to the table 7 and forward gun rest 8 which negatively effects stability.

Yet another deficiency of this shooting bench is it provides no means to elevate the operator above ground level. As discussed, shooting benches such as these are used for long distance targets. Sitting at ground level provides very limited visibility of the target (e.g. at extreme distances, even low growth can interfere with the operator's ability to see the target).

Finally, and one of the most serious deficiencies, the entire construction was not designed to maximize rigidity and minimize cantilevers. This drastically compromises the stability of the shooting bench. As alluded to, this design suffers from numerous cantilever design elements each making the design less stable and rigid. The legs 3 and 4, telescoping member 2, cross member 1, accessory tray 6, table 7, and forward gun rest 8 are all attached to the ground by at least one cantilevered bending element. As just one example, the operator's seat 9 has no less than five bending elements: cross member 1 connected to the telescoping member 2 which is then connected to ground by legs 3 and 4 and straight support bar 5.

A further disadvantage of such a design is the table 7, forward gun rest 8, and seat 9 all share the same telescoping member 2 as a support member; therefore, any disturbances in one are not only transmitted to the other but are AMPLIFIED. For example, a shift in the operator's weight on the seat 9 creates a disturbance in the table 7 that is significantly larger than the original disturbance because the shooting platform is approximately twice as far away from the legs 3 and 4 and straight support bar 5 as the cross member 1.

Additional examples of existing shooting benches are shown in FIGS. 1b and 1c. These have similar problems and design deficiencies as discussed above. Additionally, each of these have a cantilever design where the operator's seat is cantilevered off the main telescoping member without any additional support members for the operator's seat. Consequently, even very slight operator movements cause significant movement in the shooting table.

Another such shooting bench is shown in FIG. 2. Although this shooting bench does not integrate a seat directly into the main supporting members, it has many of the other deficiencies cited above such as: the operator must manually "scoot" his/her provided chair around the shooting bench; will not accommodate sloping or uneven ground; no way for the operator to gain elevation, and it still suffers from stability issues.

Also, as opposed to the shooting bench in FIG. 1, this shooting bench does not permit the operator to adjust the height of the table 15. This shooting bench requires specialized wheels 26 formed to ride along a specially formed track 11. Although the wheel 26 and track 11 method is a way to avoid having to adjust multiple clamps and/or bolts to rotate the table 15, it is easy for the operator to "de-rail" the wheels while repositioning. Also, should the track 11 or a wheel 26 become misaligned, the shooting bench may not rotate smoothly or at all.

Additionally, this shooting bench still does not provide sufficient stability for long range targets. The tricycle legs 12, 22, and 23 allow tipping of the entire shooting bench should the operator apply pressure or weight to one of the table's 15 forward corners. Also, the lack of cross-support members between the tricycle legs 12, 22, and 23 permits excessive bending and flexing further comprising stability and negatively effecting the operator's ability to maintain a steady view of the target.

In view of the shortcomings of existing equipment, there is a need for an ultra stable rotating platform that addresses these deficiencies.

BRIEF SUMMARY OF THE INVENTION

The disclosed subject matter provides an ultra stable freely rotatable platform.

It is an object of the disclosed subject matter to provide an ultra stable rotating platform which can accommodate unlevel or irregular ground and be adjusted to raise both the bench/table and the operator off the ground.

An object of the disclosed subject matter is to achieve significantly increased rigidity and stability by eliminating cantilever design elements.

An additional object of the disclosed subject matter is to provide a rotating platform that permits the operator to easily rotate in conjunction with a bench/table without the operator needing to stand or otherwise adjust his/her weight in a seat.

Another object of the disclosed subject matter is to provide a rotating platform that does not require specialized wheels or a track system.

Yet another object of the disclosed subject matter is to provide a bench/table that is adjustable to accommodate operators of different stature.

These and other aspects of the disclosed subject matter, as well as additional novel features, will be apparent from the description provided herein. The intent of this summary is not to be a comprehensive description of the claimed subject matter, but rather to provide a short overview of some of the subject matter's functionality. Other systems, methods, features and advantages here provided will become apparent to one with skill in the art upon examination of the following FIGUREs and detailed description. It is intended that all such additional systems, methods, features and advantages that are included within this description, be within the scope of any claims filed later.

BRIEF DESCRIPTIONS OF THE DRAWINGS

The novel features believed characteristic of the disclosed subject matter will be set forth in any claims filed later. The disclosed subject matter itself, however, as well as a preferred mode of use, further objectives, and advantages thereof, will best be understood by reference to the following detailed description of illustrative embodiments when read in conjunction with the accompanying drawings, wherein:

FIGS. 1a, 1b (grayscale photograph), 1c, and 2 show prior art shooting benches (prior art).

FIG. 3a and FIG. 3b show a top and side view, respectively, of the base of one embodiment of the disclosed subject matter.

FIG. 3c shows a top view of the base with the top of the deck and safety guide removed of one embodiment of the disclosed subject matter.

FIG. 4a and FIG. 4b show a top and bottom view, respectively, of the roller deck assembly of one embodiment of the disclosed subject matter.

Figure 5A:
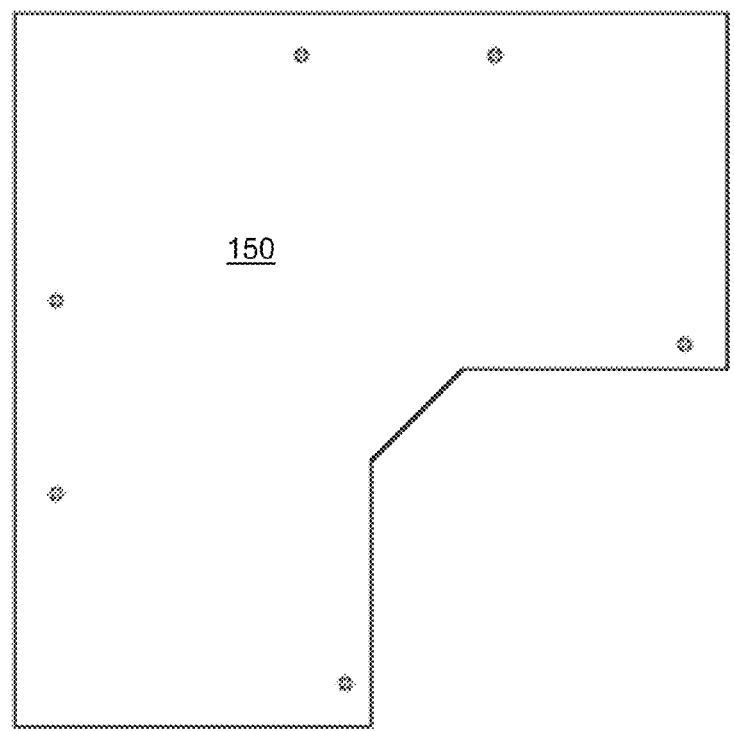
Figure 5B:
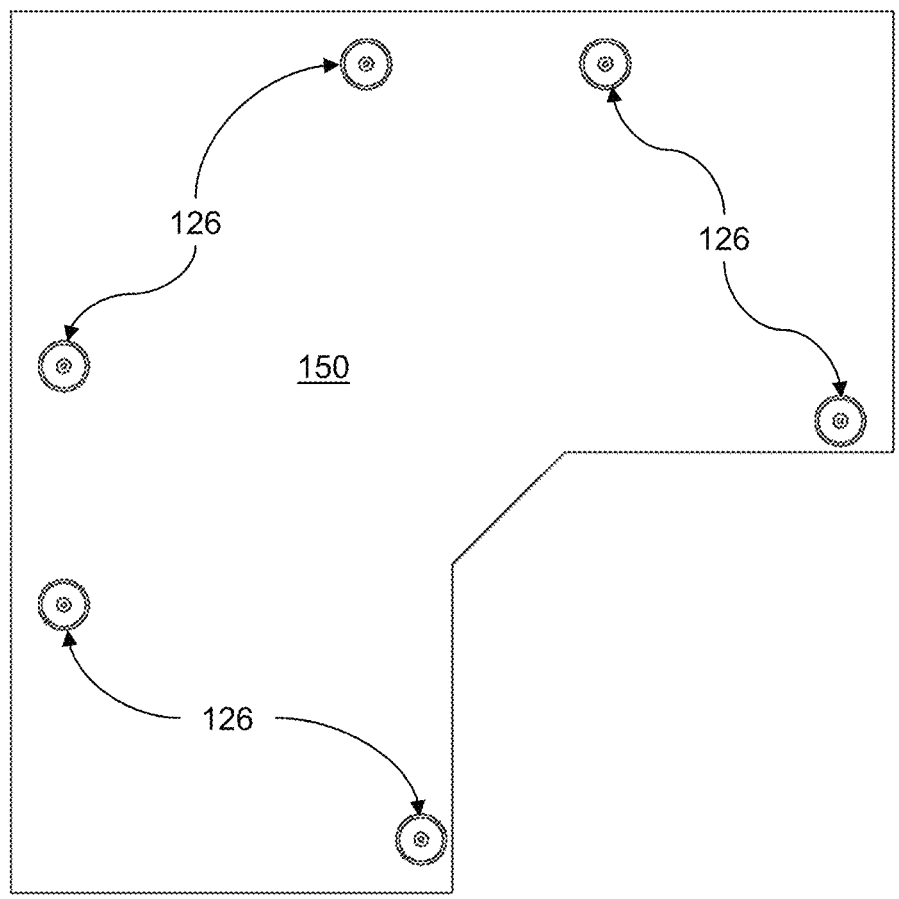
Figure 5C:
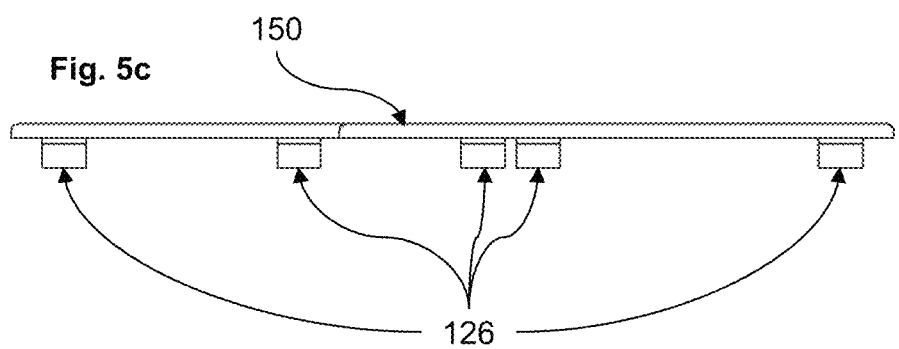

FIG. 5a, FIG. 5b, and FIG. 5c show top, bottom, and side views of the shooting deck of one embodiment of the disclosed subject matter.

Figure 6:
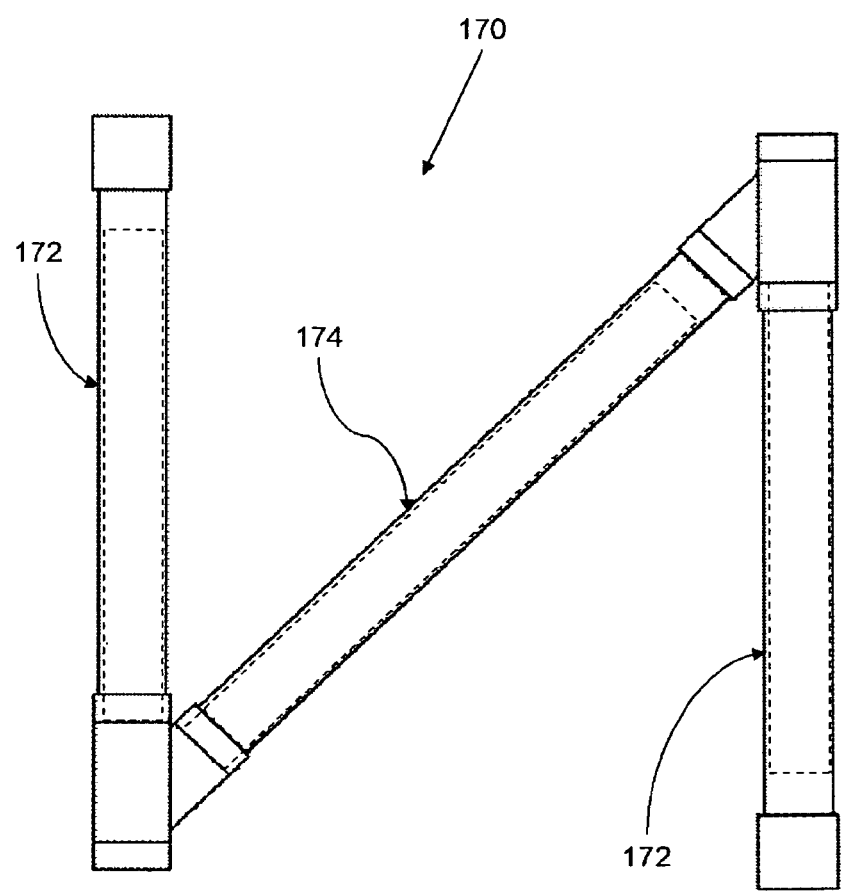

FIG. 6 shows a side view of the leg assemblies of one embodiment of the disclosed subject matter.

Figure 7A:
Figure 7B:

FIG. 7a and FIG. 7b show photographs of a prototype of one embodiment of the disclosed subject matter (grayscale photographs).

DETAILED DESCRIPTION OF ILLUSTRATIVE EMBODIMENTS

Although described with particular reference to specific embodiments, those with skill in the arts will recognize that the disclosed embodiments have relevance to a wide variety of areas in addition to those specific examples described below.

All references, including publications, patent applications, and patents, cited herein are hereby incorporated by reference to the same extent as if each reference were individually and specifically indicated to be incorporated by reference and were set forth in its entirety herein.

FIG. 3a and FIG. 3b show a top and side view, respectively, of the base 100 of an embodiment of the disclosed subject matter. The base 100 is comprised of three major components: the legs 102, the deck 104, and the safety guide 106. The legs 102 are coupled to the deck 104. Also, multiple handles 110 are provided to accommodate unloading and positioning of the base 100. In one embodiment the legs 102 are adjustable (e.g. telescoping) to accommodate uneven and/or sloping ground as well as provide additional elevation for the operator. This could be accomplished through telescoping legs 102. For example, an outer leg (not shown) could slip over the legs 102. As the base 100 was raised, a pin (not shown) could slide through a hole in the outer leg (not shown) and through holes in the legs 102 to secure the desired height (such a configuration is pictured in FIG. 7b). However, other configurations could be envisioned by those skilled in the art with the assistance of this disclosure.

In yet another embodiment, articulating feet 500 (depicted in FIG. 3b) are attached to the bottom of each leg to provide enhanced traction and/or to better accommodate slopes than would the flat bottom of the legs 102. In an additional embodiment, the base 100 could include an integrated level (such as, but not limited to a bubble level or two tubular bubble levels placed at 90 degrees to one another) to assist the operator in properly deploying the legs 102 to compensate for uneven terrain. The safety guide 106 will be discussed further in conjunction with FIG. 4.

FIG. 3c shows a top view of the base 100 with the top of the deck 104 and safety guide 106 removed (dashed lines indicate hidden or removed items). For added stability, it is important to note that the legs 102 are attached to the deck with two bolts 108 each, one from each side of the deck 104. This provides both additional rigidity and stability to the base 100. Although this embodiment uses bolts, other fasteners could be employed.

Figure 1A:
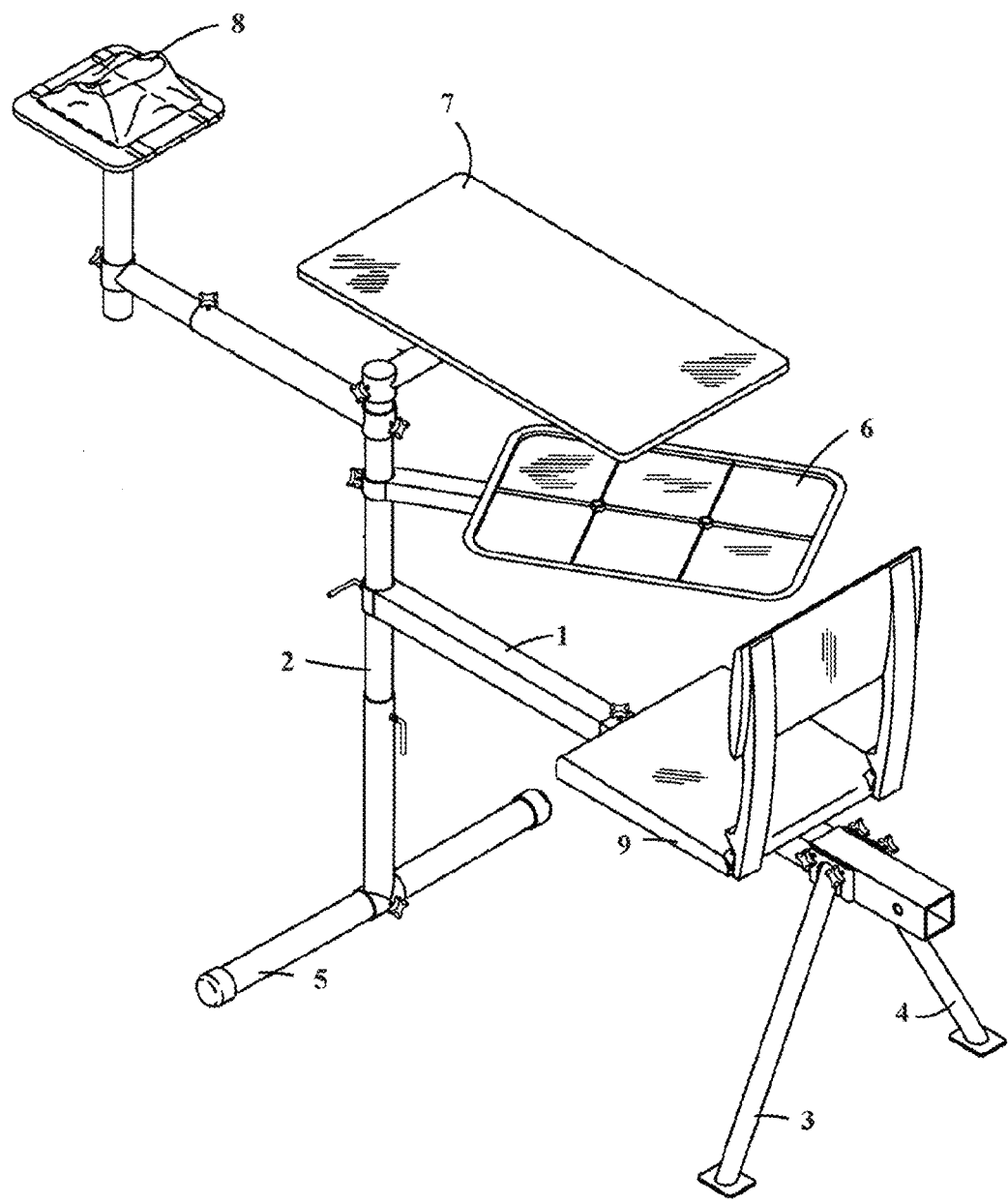
Figure 1B:
Figure 1C:
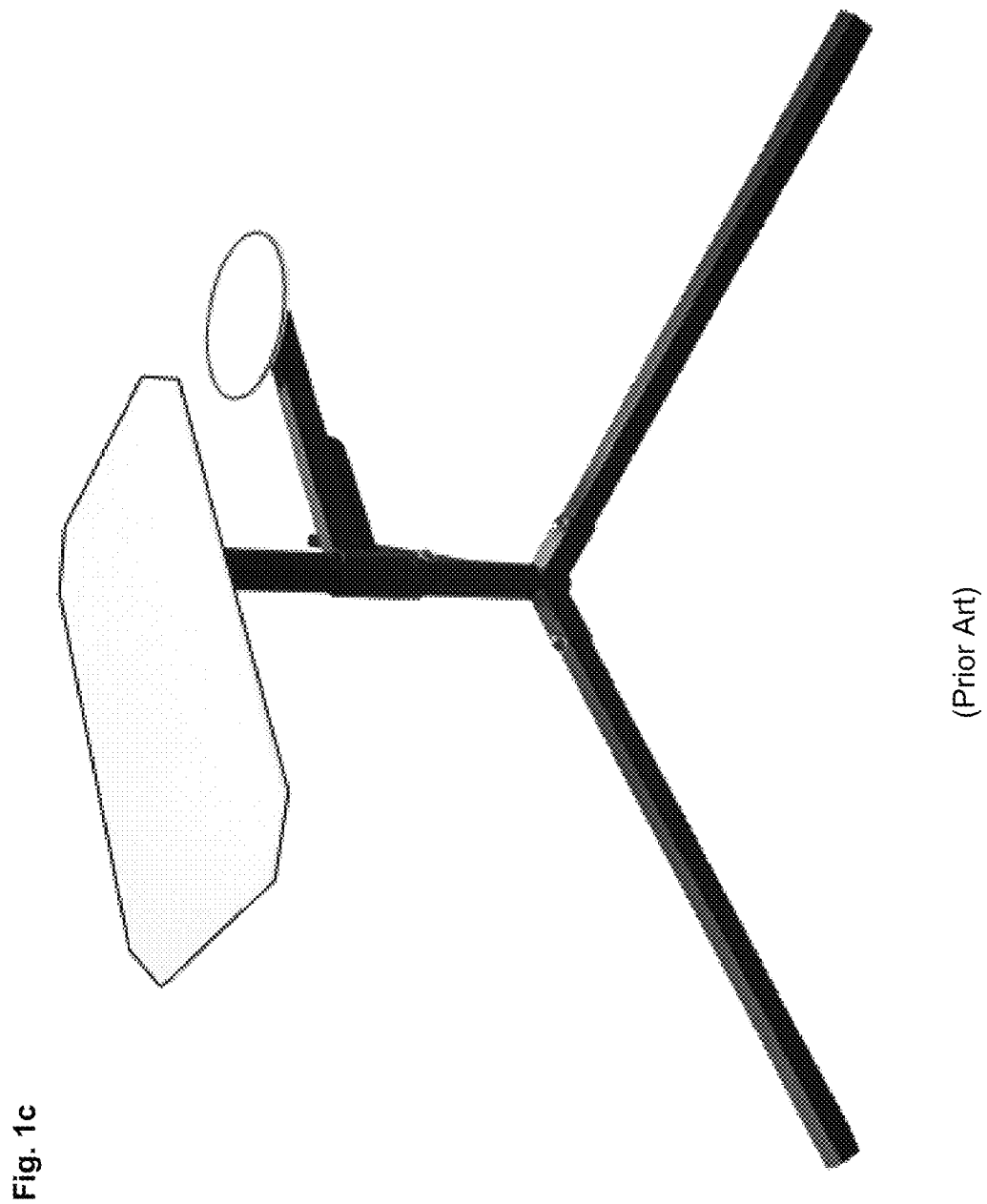
Figure 2:
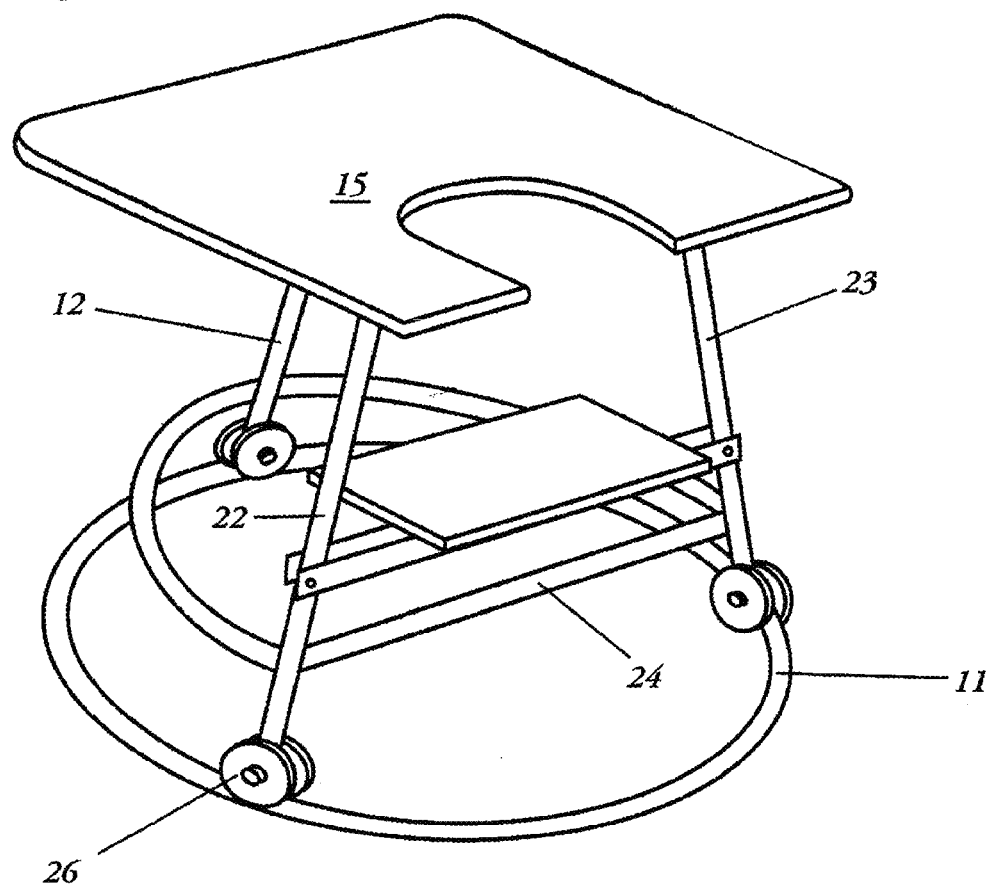
Figure 3E:
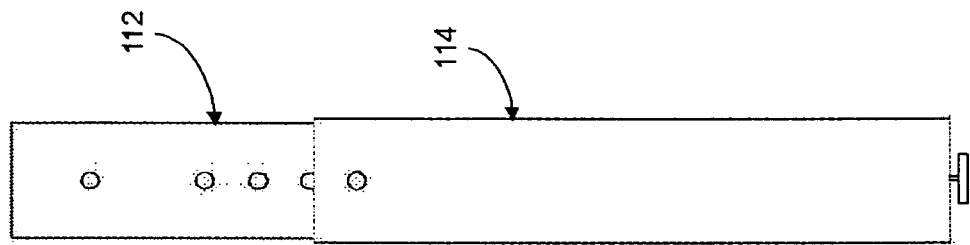
FIGS. 3d and 3e show side views of one embodiment of the telescoping leg disassembled and assembled, respectively, of the disclosed subject matter.
Figure 3E:
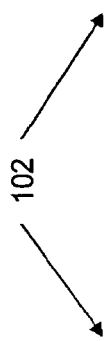
Figure 3D:
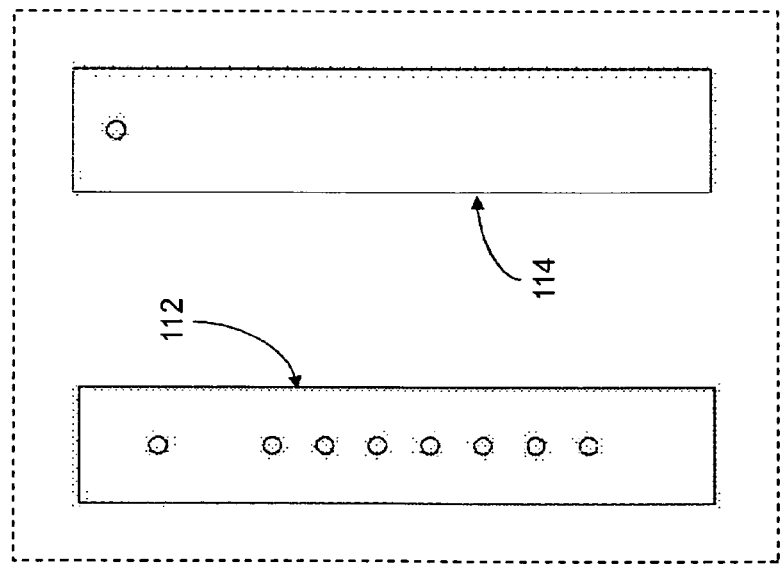

FIGS. 3d and 3e show side views of one embodiment of the leg 102 in disassembled and assembled telescoping arrangement, respectively, of the disclosed subject matter. In this embodiment, it can be seen that the stub leg 112 slides within the outer shell leg 114 until the desired height of the leg 102 is achieved. Then a pin (not shown) is slid through the aligned holes from the outer shell leg 114 through the stub leg 112.

In yet another embodiment, the leg 102 is a foldable leg. In this embodiment, it is important that when the leg is deployed (i.e. when the leg is perpendicular to the deck 104 such that the deck sits on the top of the leg and the bottom of the leg rests on the ground/floor), the leg maintains a substantially rigid connection to the deck 104.

FIG. 4a and FIG. 4b show a top and bottom view, respectively, of the roller deck assembly 120. The roller deck assembly 120 rotates on top of the deck 104 by virtue of wheels 122. The wheels 122 are attached to the bottom of the roller deck 124 with a portion of the wheel protruding through slots in the top of the roller deck 124. This allows the operator, by running his/her foot (left or right) across the exposed portion of the wheels 122, to rapidly, easily, and smoothly traverse at least an unrestricted 360 degrees (e.g. unlimited number of rotations) in either direction without adjusting his/her position. This also allows the operator to stop rotation and hold a position with minimal effort. In another embodiment, one or more motors (not shown) are affixed to one or more wheels 122 to rotate the roller deck assembly 120 when the operator chooses. In another embodiment, brakes (not shown) are affixed to one or more wheels in order to fix the rotational axis. In this embodiment the wheels 122 could be mounted completely below the roller deck 124 or remain with a portion above the roller deck 124 for finer rotational control. Chair guards 130 extend beyond the top of the roller deck 124 and provide a "stop" for an operator's chair. In this manner, the operator is prevented from sliding his/her chair (not shown) so far backwards that he/she falls from the roller deck assembly 120 (see FIG. 7a and FIG. 7b for chair positioning). Note that this design permits unrestricted and unlimited rotation (e.g. multiple rotations) without regard to the platforms height above the ground.

Referring now to only FIG. 4a, the connectors 126 are provided to securely attach the leg assemblies (not shown). The leg assemblies (not shown) are coupled to the roller deck assembly 120 by sliding over the connectors 126. This type of connection is sufficient because there are no bending moments at these connection points (the legs (not shown) are completely in compression). If the connector-leg interface was not specifically designed to maintain the legs (not shown) in compression, a significantly more rigid connection would be needed to achieve the required level of rigidity and stability.

Figure 4C:
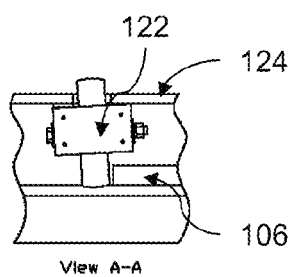
FIG. 4c shows a cut-away view of the wheel mounted onto the roller deck of one embodiment of the disclosed subject matter.

FIG. 4c shows a cut-away view of the wheel 122 mounted onto the roller deck 124. It is an important feature of the disclosed subject matter that the there is camber between the wheel 122 (for instance, the axis of rotation of the wheel 122) and the surface on which the wheel rolls (such as, but not limited to, a wheel 122 not mounted perpendicular to the roller deck 124; the rolling surface of the wheel being angled; the surface on which the wheel 122 rolls is angled; etc.). The wheel 122 is mounted such that the top of the wheel leans slightly away from the safety guide 106. By using a cambered wheel 122 very high lateral stiffness and stability can be achieved using ordinary and inexpensive componentry because the mechanical bias of the camber insures "take-up" of all mechanical tolerances in the wheel and/or wheel assembly. Additionally, as a substitute to a cambered wheel 122 a hard surfaced crowned wheel could be employed. As opposed to a normal wheel which has a flat surface to contact the ground, a crowned wheel has a generally rounded surface that contacts the ground. By using a hard surfaced crowned wheel, higher stability and stiffness is achieved by allowing the wheel to "naturally" find the optimum position which removes the inherent "slop" in the wheel and/or wheel assembly. Also, by reducing the contact area between the wheel and the deck 104, the hard surfaced crowned wheel also reduces friction. In one embodiment a hard surfaced cambered wheel 122 that is also crowned is employed. It is also important to note that the wheels 122 move independently of the safety guide 106 and do not use it or require a track. Additionally, it is important that the safety guide 106 is positioned on the inside of the wheel 122 arc to lower the wheel-to-guide surface binding tendency because the relative motion between the wheel 122 and the safety guide 106 forces the wheel 122 away from the safety guide 106 rather than towards it. When occasional contact does occur between the wheel 122 and the safety guide 106, wheel 122 side wall abrasion is minimized because of minimal contact area, minimal and occasional contact force, and the low level of relative motion between the two at the interface point. Also, by placing the wheels 122 outside of the safety guide 106, the maximum radius of the wheel arc is achieved which provides increased stability and stiffness for the roller deck assembly 124 and shooting deck. The safety guide 106 is only to provide protection against the operator accidentally rotating the roller deck assembly 124 off of the base 100.

Figure 4D:
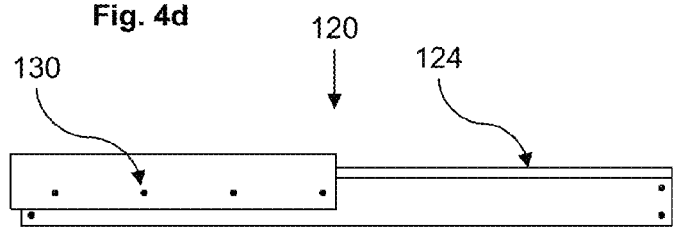
FIG. 4d shows a side view of the roller deck assembly with the wheels and connectors removed of one embodiment of the disclosed subject matter.

FIG. 4d shows a side view of the roller deck assembly 120 with the wheels 122 and connectors 126 removed. This view accentuates the additional safety feature provided by the chair guards 130.

FIG. 5a, FIG. 5b, and FIG. 5c show top, bottom, and side views respectively of the shooting deck 150. The shooting deck 150 provides a stable and flat surface for the operator to use. Referring to FIG. 5a and FIG. 5b, the shooting deck 150 has one corner removed to provide equal accommodation for either a left or right-handed operator. Referring to FIG. 5b and FIG. 5c, connectors 126 are provided to securely and compressively attach the leg assemblies (not shown).

FIG. 6 shows a side view of the leg assemblies 170. Each leg assembly 170 is comprised of two vertical members 172 and one cross member 174. The cross member 174 is attached to the bottom portion of one vertical member 172 and the top portion of the other vertical member 172. This provides substantially increased rigidity and stability over the prior art.

Additionally, in one embodiment leg segments (not shown) could be used to raise the shooting deck 150 to accommodate operators of differing stature. For example, the segments could be about two inches tall and be stacked between the top most (or bottom most) ends of the vertical members 172. This retains the required rigidity while providing a simple, efficient, and cost effective way to adjust the height of the shooting deck 150 with respect to the roller deck 124.

In yet another embodiment the top and or bottom of the vertical members 172, above or below the intersection of the cross member 174 respectively, could have a telescoping ability. One way to accomplish the telescoping ability is to have a smaller diameter vertical member (not shown) disposed within the vertical member 172. The smaller diameter vertical member (not shown) could then be coupled to either the shooting deck 150 or the roller deck assembly 120. To maintain the preferred rigidity and stability, it would be advisable to have the smaller diameter vertical member (not shown) to have an outer diameter only slightly less than the inner diameter of the vertical member 172 and the full length of the vertical member 172, although other configurations could be envisioned by those skilled in the art with the assistance of this disclosure.

FIG. 7a and FIG. 7b show photographs of a prototype of one embodiment of the disclosed subject matter. In this embodiment, the entire device can be seen fully assembled. Also, the configuration of the leg assemblies 170 can be seen. This configuration also displays the significant torsional rigidity between the shooting deck 150 and the roller deck assembly 120; however, one skilled in the art with this disclosure could use alternative configurations to achieve the same goal. This embodiment also depicts the ability of the platform to accommodate various accessories, such as, but not limited to: gun rack, tripod, barrel cooling apparatus, ice chest, etc. Co-location of these various accessories, with respect to the operator and the roller and shooting decks, is made possible because the roller deck assembly and shooting deck move together without consideration as to their height off the ground.

Although example diagrams to implement the elements of the disclosed subject matter have been provided, one skilled in the art, using this disclosure, could develop additional hardware and/or software to practice the disclosed subject matter and each is intended to be included herein.

In addition to the above described embodiments, those skilled in the art will appreciate that this disclosure has application in a variety of arts and situations and this disclosure is intended to include the same.

What is claimed is:

1. A rotating platform, said platform comprising:
   a base, said base comprising:
      at least four removable and independently telescoping base legs;
      a deck, said deck rigidly coupled to each of said base legs when said base legs are deployed; and
      a circular safety guide coupled to a top of said deck;
   a roller deck assembly, said roller deck assembly positioned on said top of said deck and comprising:
      a roller deck;
      at least one chair guard, wherein said chair guard is coupled to said roller deck such that a portion of said chair guard extends above said roller deck;
      a plurality of wheels, each respective wheel of said wheels is cambered such that a top of each respective wheel is further from a center of said circular safety guide than a corresponding bottom of said each respective wheel, each respective wheel is crowned such that a roller surface is generally rounded transverse to a plane defined by each said wheel respectively so that the roller surfaces respectively contact said deck at a contact point near and adjacent to an outer circumference of said safety guide and do not use said safety guide as a track, and wherein at least a portion of at least one of said wheels protrudes through a top of said roller deck, said portion of said at least one of said wheels can accommodate both left and right foot operators so that a foot of an operator can directly contact and move said portion to cause rotation of said at least one wheel associated with said portion which causes the roller deck to rotate relative to said deck; and
   wherein said roller deck assembly is capable of rotating on said deck with at least 360 degrees of unrestricted range of motion in both directions by moving said portion of said at least one of said wheels;
   a shooting deck, said shooting deck can accommodate both left and right handed operators, wherein said shooting deck is coupled to said roller deck via at least three height adjustable shooting deck leg assemblies, said height adjustable shooting deck leg assemblies respectively comprising:
      at least two vertical members; and
      at least one cross member, wherein an end of said cross member is coupled generally towards a top of a first of said vertical members and another end of said cross member is coupled generally towards a bottom of a second of said vertical members such that said cross member is angled between said first and second vertical members.

2. The platform of claim 1, said base legs additionally comprising feet, said feet coupled to a bottom of said base legs and capable of articulation independent from said base legs such that said feet maintain substantial contact with sloping, irregular, and/or uneven ground.

* * * * *